(12) United States Patent
Nandwana et al.

(10) Patent No.: US 12,281,017 B2
(45) Date of Patent: Apr. 22, 2025

(54) NANOCOMPOSITES AND RELATED METHODS

(71) Applicant: Northwestern University, Evanston, IL (US)

(72) Inventors: Vikas Nandwana, Evanston, IL (US); Vinayak P. Dravid, Glenview, IL (US)

(73) Assignee: Northwestern University, Evanston, IL (US)

( * ) Notice: Subject to any disclaimer, the term of this patent is extended or adjusted under 35 U.S.C. 154(b) by 814 days.

(21) Appl. No.: 17/417,328

(22) PCT Filed: Dec. 20, 2019

(86) PCT No.: PCT/US2019/067782
§ 371 (c)(1),
(2) Date: Jun. 22, 2021

(87) PCT Pub. No.: WO2020/142266
PCT Pub. Date: Jul. 9, 2020

(65) Prior Publication Data
US 2022/0059839 A1    Feb. 24, 2022

Related U.S. Application Data

(60) Provisional application No. 62/788,321, filed on Jan. 4, 2019, provisional application No. 62/788,347, filed on Jan. 4, 2019.

(51) Int. Cl.
*C01B 32/22* (2017.01)
*B01J 20/06* (2006.01)
(Continued)

(52) U.S. Cl.
CPC .............. *C01B 32/22* (2017.08); *B01J 20/06* (2013.01); *B01J 20/20* (2013.01); *B01J 20/262* (2013.01);
(Continued)

(58) Field of Classification Search
CPC ............................... B82Y 40/00; B82Y 30/00
See application file for complete search history.

(56) References Cited

U.S. PATENT DOCUMENTS 9,911,974 B2    3/2018   de Guzman et al.
2003/0224168 A1  12/2003  Mack et al.
(Continued)

FOREIGN PATENT DOCUMENTS

CN      103965835 A    8/2014
KR    2014 0073720 A    6/2014
(Continued)

OTHER PUBLICATIONS

The extended European Search Report issued on Jan. 26, 2022 for EP Patent Application No. 19907789.2; pp. 1-11.
(Continued)

*Primary Examiner* — Nathanael T Zemui
(74) *Attorney, Agent, or Firm* — Bell & Manning, LLC

(57) ABSTRACT

Methods of forming a nanocomposite of a base material and a plurality of nanoparticles are provided. In embodiments, the method comprises combining a first input stream of flowing fluid comprising a base material having nucleation sites, a second input stream of flowing fluid comprising a nanoparticle precursor material, and a third input stream of flowing fluid comprising a nanoparticle nucleation agent, to form an output stream of flowing fluid; heating or sonicating or both heating and sonicating the output stream for a period of time; and collecting a nanocomposite formed within the fluid of the output stream, the nanocomposite comprising the base material and a plurality of nanoparticles directly anchored onto a surface of the base material via the nucleation sites. The nanocomposites are also provided.

14 Claims, 6 Drawing Sheets

(51) Int. Cl.

| | | |
|---|---|---|
| *B01J 20/20* | (2006.01) | |
| *B01J 20/26* | (2006.01) | |
| *B01J 20/28* | (2006.01) | |
| *B01J 20/32* | (2006.01) | |
| *B82Y 30/00* | (2011.01) | |
| *B82Y 40/00* | (2011.01) | |
| *C01B 32/20* | (2017.01) | |
| *C02F 1/28* | (2023.01) | |
| *C02F 101/32* | (2006.01) | |
| *C02F 103/00* | (2006.01) | |
| *C09K 3/32* | (2006.01) | |
| *C10G 25/00* | (2006.01) | |
| *C11B 13/04* | (2006.01) | |
| *H01M 4/02* | (2006.01) | |
| *H01M 4/583* | (2010.01) | |
| *H01M 4/66* | (2006.01) | |

(52) U.S. Cl.
CPC ... *B01J 20/28007* (2013.01); *B01J 20/28009* (2013.01); *B01J 20/32* (2013.01); *B01J 20/3212* (2013.01); *B01J 20/3236* (2013.01); *B01J 20/324* (2013.01); *B82Y 30/00* (2013.01); *C01B 32/20* (2017.08); *C02F 1/281* (2013.01); *C02F 1/283* (2013.01); *C02F 1/288* (2013.01); *C09K 3/32* (2013.01); *C10G 25/003* (2013.01); *C10G 25/006* (2013.01); *C11B 13/04* (2013.01); *H01M 4/583* (2013.01); *H01M 4/667* (2013.01); *B82Y 40/00* (2013.01); *C02F 2101/32* (2013.01); *C02F 2103/007* (2013.01); *C02F 2303/16* (2013.01); *C10G 2300/1003* (2013.01); *C10G 2300/1014* (2013.01); *H01M 2004/021* (2013.01)

(56) References Cited

U.S. PATENT DOCUMENTS

| | | | |
|---|---|---|---|
| 2004/0108276 A1 | 6/2004 | Christodoulou | |
| 2009/0198076 A1 | 8/2009 | Guckel | |
| 2012/0018382 A1 | 1/2012 | Stein | |
| 2013/0284968 A1 | 10/2013 | Azizov et al. | |
| 2014/0183415 A1* | 7/2014 | Song | B82Y 30/00 252/502 |
| 2015/0217222 A1 | 8/2015 | Hedin et al. | |
| 2016/0204416 A1 | 7/2016 | Wu et al. | |
| 2016/0243523 A1 | 8/2016 | Saini et al. | |
| 2017/0136062 A1* | 5/2017 | Alsharaeh | A61K 31/704 |
| 2018/0208734 A1 | 7/2018 | Ozkan et al. | |
| 2018/0241032 A1 | 8/2018 | Pan et al. | |
| 2018/0370801 A1* | 12/2018 | Patole | C09D 11/00 |
| 2019/0389744 A1 | 12/2019 | Biris et al. | |
| 2021/0107792 A1 | 4/2021 | Nandwana et al. | |
| 2022/0118422 A1 | 4/2022 | Nandwana et al. | |

FOREIGN PATENT DOCUMENTS

| | | |
|---|---|---|
| KR | 10-2018-0037659 A | 4/2018 |
| WO | WO 2012/155196 A1 | 11/2012 |
| WO | WO 2013022051 A1 | 2/2013 |
| WO | WO 2017015648 A1 | 1/2017 |
| WO | WO 2020/142267 | 7/2020 |

OTHER PUBLICATIONS

Bracamonte M. Victoria et al., "Lithium dual uptake anode materials: crystalline Fe3O4 nanoparticles supported over graphite for lithium-ion batteries," *Electrochimica Acta*, Elsevier, Amsterdam, NL, vol. 258, Oct. 7, 2017 (Oct. 7, 2017), pp. 192-199, XP085310877, ISSN: 0013-4686, DOI: 10.1016/J.Electacta.2017.10.034.

Xu Z. et al., "Dispersion of iron nano-particles on expanded graphite for the shielding of electromagnetic radiation," *Journal of Magnetism and Magnetic Materials*, Elsevier, Amsterdam, NL, vol. 322, No. 20, Oct. 1, 2010 (Oct. 1, 2010), pp. 3084-3087, XP027135542, ISSN: 0304-8853 [retrieved on May 25, 2010].

The extended European Search Report issued on Jan. 26, 2022 for EP Patent Application No. 19907115.0; pp. 1-13.

Hamed Hosseini Bay et al., "Scalable Multifunctional Ultra-Thin Graphite Sponge: Free-standing, Superporous, Superhydrophobic, Oleophilic Architecture with Ferromagnetic Properties for Environmental Cleaning," *Scientific Reports*, vol. 6, Feb. 24, 2016 (Feb. 24, 2016), pp. 1-9, XP055347982, DOI: 10.1038/srep21858.

Wen Qi et al., "Sandwich-structured nanocomposites of N-doped graphene and nearly monodisperse Fe3O4 nanoparticles as high-performance Li-ion battery anodes," *Nano Research* 2017, vol. 10, No. 9; pp. 2923-2933.

Lei Zhang et al., "Iron-Oxide-Based Advanced Anode Materials for Lithium-Ion Batteries," *Adv. Energy Mater.* 2014, vol. 4; pp. 1300958 (1 of 11).

Guangmin Zhou et al., "Graphene-Wrapped Fe3O4 Anode Material with Improved Reversible Capacity and Cyclic Stability for Lithium Ion Batteries," *Chem. Mater.* 2010, vol. 22; pp. 5306-5313. DOI:10.1021/cm101532x.

Taegyune Yoon et al., "Electrostatic Self-Assembly of Fe3O4 Nanoparticles on Graphene Oxides for High Capacity Lithium-Ion Battery Anodes," *Energies* 2013, vol. 6; pp. 4830-4840. Doi: 10.3390/en6094830.

Paul M. Winkler et al., "Heterogeneous Nucleation Experiments Bridging the Scale from Molecular Ion Clusters to Nanoparticles," *Science* Mar. 7, 2008, vol. 319; pp. 1374-1377.

Xiaoyang Pan et al., "Defect-Mediated Growth of Noble-Metal (Ag, Pt, and Pd) Nanoparticles on TiO2 with Oxygen Vacancies for Photocatalytic Redox Reactions under Visible Light," *The Journal of Physical Chemistry C* 2013, vol. 117; pp. 17996-18005. dx.doi.org/10.1021/jp4064802.

The International Search Report and the Written Opinion issued on Mar. 18, 2020 for International Patent Application No. PCT/US2019/067782; pp. 1-12.

Andrea C. Ferrari, "Raman Spectroscopy of graphene and graphite: Disorder, electron-phonon coupling, doping and nonadiabatic effects," *Solid State Communications*, vol. 143, Apr. 27, 2007 [retrieved on Feb. 5, 2020]. Retrieved from the Internet, URL: https://pubs.acs.org/doi/abs/10.1021/cm101532x. pp. 5306-5313.

D. Morillo et al., Poster—"Fe3O4 Nanoparticles-Loaded Cellulose Sponge: Novel system for the Arsenic removal from aqueous solution," TNT2009, Sep. 7-11, 2009, Barcelona—Spain; pp. 1-2.

Shanhu Liu et al., "Superhydrophobic/Superoleophilic magnetic polyurethane sponge for oil/water separation†," *RSC Adv.*, 2015, vol. 5; pp. 68293-68298.

Xuemei Zhang et al., "Preparation of Superhydrophobic Magnetic Polyurethane Sponge for Removing Oil Pollutants from Water," *IOP Conf. Series: Materials Science and Engineering*, 2018, vol. 392, 042003; pp. 1-7.

Viet-Ha Thi Tran et al., "Novel fabrication of a robust superhydrophobic PU@ZnO@ Fe3O4@SA sponge and its application in oil-water separations," *Scientific Reports*, vol. 7, 17520; pp. 1-12. DOI:10.1038/s41598-017-17761-9, Published online Dec. 13, 2017.

M. Anju et al., "Magnetically actuated graphene coated polyurethane foam as potential sorbent for oils and organics," *Arabian Journal of Chemistry* 2018; pp. 1-11. https://doi.org/10.1016/j.arabjc.2018.01.012.

Lei Wu et al., "Magnetic, Durable, and Superhydrophobic polyurethane@Fe3O4@SiO2@Fluoropolymer Sponges for Selective Oil Absorption and Oil/Water Separation," *ACS Appl. Mater. interfaces* 2015, vol. 7; pp. 4936-4946.

Huili Peng et al., "Preparation of Superhydrophobic Magnetic Cellulose Sponge for Removing Oil from Water," *Ind. Eng. Chem. Res.* 2016, vol. 55; pp. 832-838.

The International Search Report and Written Opinion issued in International Patent Application No. PCT/US18/46674 on Jan. 11, 2019, pp. 1-11.

(56) References Cited

OTHER PUBLICATIONS

Liu et al., "Iron Oxide Decorated MoS2 Nanosheets with Double PEGylation for Chelator-Free Radiolabeling and Multimodal Imaging Guided Photothermal Therapy," *ACS Nano* 2015, vol. 9, No. 1, pp. 950-960.
Nandwana et al., "One-Pot Green Synthesis of Fe3O4/ MoS2 0D/2D Nanocomposites and Their Application in Noninvasive Point-of-Care Glucose Diagnostics," *ACS Appl. Nano Mater.* 2018, vol. 1, pp. 194901958.
Peng et al., "Ultrathin Two-Dimensional MnO2/Graphene Hybrid Nanostructures for High-Performance, Flexible Planar Supercapacitors," *Nano Letters* 2013, vol. 13, pp. 2151-2157.
Peng et al., Supporting Information for "Ultrathin Two-Dimensional MnO2/Graphene Hybrid Nanostructures for High-Performance, Flexible Planar Supercapacitors," 2013, pp. 1-11.
Wang et al., "Biosensor Based on Ultrasmall MoS2 Nanoparticles for Electrochemical Detection of H2O2 Released by Cells at the Nanomolar Level," *Anal. Chem.* 2013, vol. 85, pp. 10289-10295.
Yu et al., "Smart MoS2/ Fe3O4 Nanotheranostic for Magnetically Targeted Photothermal Therapy Guided by Magnetic Resonance/ Photoacoustic Imaging," *Theranostics* 2015, vol. 5, Issue 9, pp. 931-945.
Joensen et al., "Single-Layer MoS2," *Mat. Res. Bull.* 1986, vol. 21, pp. 457-461.
Zhu et al., "Fast Li Storage in MoS2-Graphene-Carbon Nanotube Nanocomposites: Advantageous Functional Integration of 0D, 1D, and 2D Nanostructures," *Adv. Energy Mater.* 2015, vol. 5, pp. 1401170-1401177.
V. Nicolosi et al., "Liquid Exfoliation of Layered Materials," *Science* Jun. 21, 2013, vol. 340, pp. 1226419-1-1226419-18.
D. Yang et al., "Li-Intercalation and Exfoliation of WS2," *J. Phys. Chem. Solids* 1996, vol. 57, Nos. 6-8, pp. 1113-1116.
Kufer et al., "Hybrid 2D-0D MoS2-PbS Quantum Dot Photodetectors," *Adv. Mater.* 2015, vol. 27, pp. 176-180.
Q. Qu et al., "2D Sandwich-like Sheets of Iron Oxide Grown on Graphene as High Energy Anode Material for Supercapacitors," *Adv. Mater.* 2011, vol. 23, pp. 5574-5580.
Jonathan N. Coleman, "Liquid Exfoliation of Defect-Free Graphene," *Accounts of Chemical Research* 2013, vol. 46, No. 1, pp. 14-22.
Ahmad et al., "Functionalized Molybdenum Disulfide Nanosheets for 0D-2D Hybrid Nanostructures: Photoinduced Charge Transfer and Enhanced Photo response," *J. Phys. Chem. Lett.* 2017, vol. 8, pp. 1729-1738.
Sandoval et al., "Raman study and lattice dynamics of single molecular layers of MoS2," *The American Physical Society Physical Review B* Aug. 15 1991—II, vol. 44, No. 8, pp. 3955-3962.

Smith et al., "Large-Scale Exfoliation of Inorganic Layered Compounds in Aqueous Surfactant Solutions," *Adv. Mater.* 2011, vol. 23, pp. 3944-3948.
Chou et al., "Ligand Conjugation of Chemically Exfoliated MoS2," *J. Am. Chem. Soc.* 2013, vol. 135, pp. 4584-4587.
The International Search Report and the Written Opinion issued on Apr. 21, 2021 for International Patent Application No. PCT/US2021/019324; pp. 1-12.
Lei et al., "Simple fabrication of multi-functional melamine sponges," *Materials Letters*, vol. 190, Dec. 28, 2016 [retrieved on Mar. 28, 2021]. Retrieved from the Internet: ,URL: https://www.sciencedirect.com/science/article/abs/pii/S0167577X16319668>. pp. 119-122.
Calcagnile et al., "Magnetically Driven Floating Foams for the Removal of Oil Contaminants from Water," ACS Nano, vol. 6, No. 6, May 11, 2012 [retrieved on Mar. 28, 2021]. Retrieved from the Internet: URL: https//pubs.acs.org/doi/abs/10.1021/nn3012948. pp. 5413-5419.
Guan et al., "Superwetting Polymeric Three Dimensional (3D) Porous Materials for Oil/Water Separation: A Review," Polymers, vol. 11, No. 806, May 6, 2019 [retrieved on Mar. 28, 2021]. Retrieved from the Internet: URL: https://www.mdpi.com/2073-4360/11/5/806 . . . pp. 1-34.
Zeeshan Ajmal et al., "Phosphate removal from aqueous solution using iron oxides: Adsorption, desorption and regeneration characteristics," *Journal of Colloid and Interface Science* May 2018, vol. 528; pp. 145-155.
Dema A. Almasri et al., Adsorption of phosphate on iron oxide doped halloysite nanotubes, *Scientific Reports* 2019, vol. 9, 3232; pp. 1-13. https://doi.org/10.1038/s41598-019-39035-2.
Jiang, D., Amano, Y. & Machida, M. Removal and Recovery of Phosphate from Water by a Magnetic Fe3O4@ASC Adsorbent. *Journal of Environmental Chemical Engineering* 5, 4229-4238 (2017).
Yoon, S. Y. et al. Kinetic, Equilibrium and Thermodynamic Studies for Phosphate Adsorption to Magnetic Iron Oxide Nanoparticles. *Chemical Engineering Journal* 236, 341-347 (2014).
Choi, J., Chung, J., Lee, W. & Kim, J. O. Phosphorous Adsorption on Synthesized Magnetite in Wastewater. *Journal of Industrial and Engineering Chemistry* 34, 198-203 (2016).
Zach-Maor, A., Semiat, R. & Shemer, H. Synthesis, Performance, and Modeling of Immobilized Nano-Sized Magnetite Layer for Phosphate Removal. *Journal of Colloid and Interface Science* 357, 440-446 (2011).
Jung, K. W. & Ahn, K. H. Fabrication of Porosity-Enhanced MgO/biochar for Removal of Phosphate from Aqueous Solution: Application of a Novel Combined Electrochemical Modification Method. *Bioresource Technology* 200, 1029-1032 (2016).

\* cited by examiner

NANOCOMPOSITES AND RELATED METHODS

CROSS-REFERENCE TO RELATED APPLICATIONS

This application is a National Stage of International Application No. PCT/US19/67782, filed Dec. 20, 2019, which claims the benefit of U.S. Patent Application No. 62/788,321, filed Jan. 4, 2019 and U.S. Patent Application No. 62/788,347, filed Jan. 4, 2019, the contents of all of which are herein incorporated by reference.

BACKGROUND

Lithium ion batteries (LIBs) have been used as a primary energy storage for portable electronics. In LIBs, Li ions shuttle from cathode to anode and vice versa. The capacity of an LIB is determined by the capacity of Li ion storage by the anode and cathode materials; hence, anode and cathode materials play dominant roles in the performance of LIBs. Although there has been significant improvement in the capacity of cathode materials, graphite has been used as a prominent anode material for LIBs since their commercialization due to its cyclic performance, natural abundance, low cost, and ecofriendly nature. However, there are several anode materials that have shown higher capacity than graphite, such as Si, Sn, and metal oxides. However, most of these high-capacity materials suffer from volume expansion (up to 400%) during lithiation, which results in pulverization of electrodes. This poses a serious cyclability issue since capacity drops during cycling due to pulverization and sometimes can result in the loss of electrical contacts. A variety of newly designed configurations have been proposed to improve cyclic performance but suffer from high cost of synthesis and scalability for mass production.

SUMMARY

Provided are nanocomposites of a base material and a plurality of nanoparticles. The nanoparticles are intimately associated with the base material such that, at least in embodiments, the overall morphology of the nanocomposite is similar to that of the unmodified base material, but the nanocomposite has improved properties as compared to the unmodified base material. The nanocomposites may be used for a variety of applications, including energy storage applications. In energy storage applications, the nanocomposites may be incorporated into electrodes and batteries, e.g., lithium ion batteries. Methods of making the nanocomposites are also provided.

In embodiments, a method of forming a nanocomposite of a base material and a plurality of nanoparticles is provided which comprises combining a first input stream of flowing fluid comprising a base material having nucleation sites, a second input stream of flowing fluid comprising a nanoparticle precursor material, and a third input stream of flowing fluid comprising a nanoparticle nucleation agent, to form an output stream of flowing fluid; heating or sonicating or both heating and sonicating the output stream for a period of time; and collecting a nanocomposite formed within the fluid of the output stream, the nanocomposite comprising the base material and a plurality of nanoparticles directly anchored onto a surface of the base material via the nucleation sites.

Nanocomposites formed from the disclosed methods are also provided.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIG. 1B also shows that the nanocomposite may be provided as a formulation with water or an aqueous solution.

DETAILED DESCRIPTION

Provided are nanocomposites of a base material and a plurality of nanoparticles. The nanoparticles are intimately associated with the base material such that, at least in embodiments, the overall morphology of the nanocomposite is similar to that of the unmodified base material, but the nanocomposite has improved properties as compared to the unmodified base material. The nanocomposites may be used for a variety of applications, including energy storage applications. In energy storage applications, the nanocomposites may be incorporated into electrodes and batteries, e.g., lithium ion batteries. In at least some embodiments, the nanocomposites, when used as the anodes for lithium ion batteries, exhibit improved cyclic stability as well as higher capacities as compared to anodes comprising unmodified graphite. Methods of making the nanocomposites are also provided.

Figure 1A:
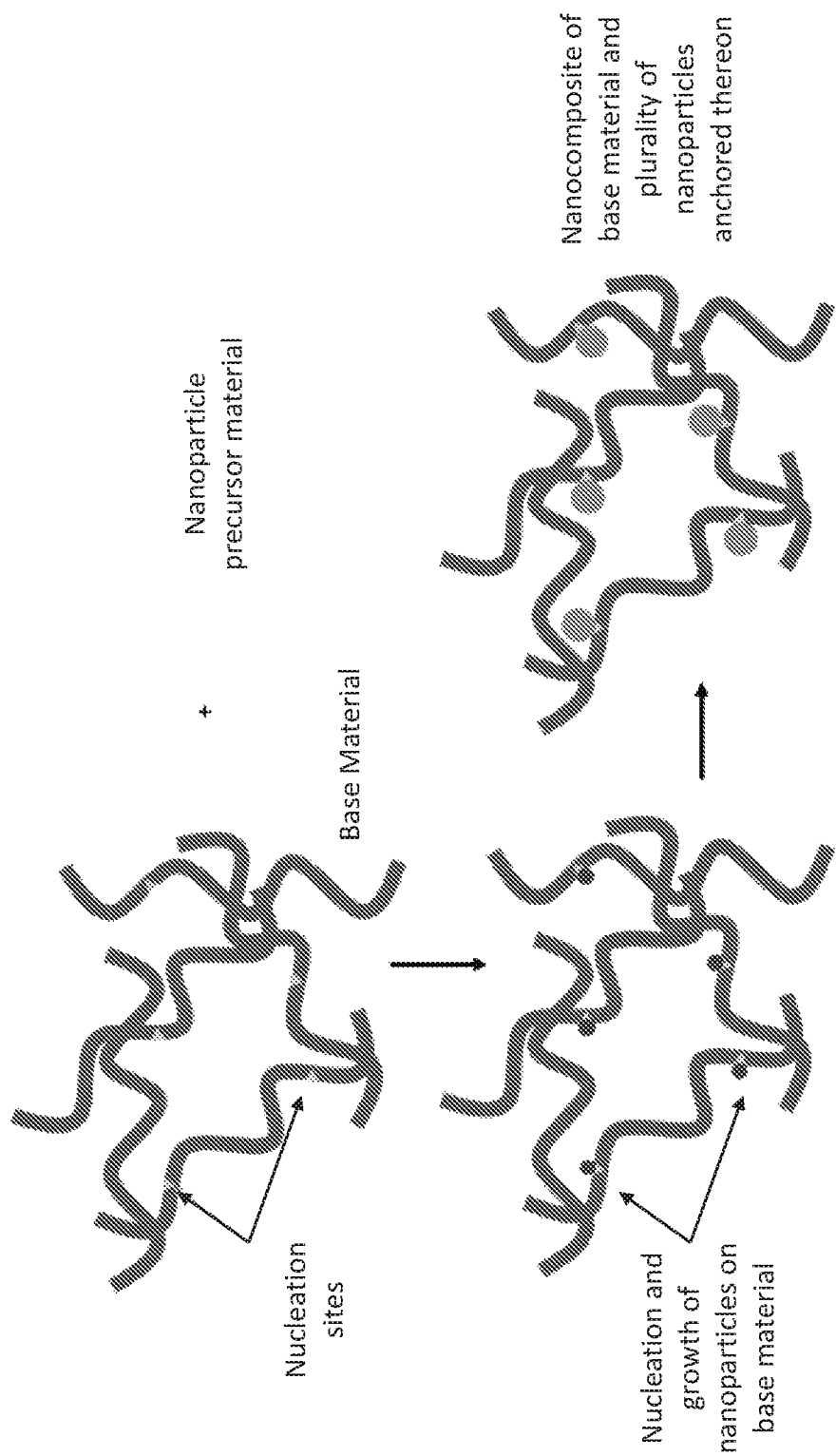
FIG. 1A depicts a schematic of heterogeneous nucleation events associated with formation of an illustrative nanocomposite of a base material and a plurality of nanoparticles.

The nanocomposites comprise a base material and a plurality of nanoparticles anchored onto a surface of the base material. The unique method of making the nanocomposites (further described below) facilitates heterogeneous nucleation of the nanoparticles from a nanoparticle precursor material directly at nucleation sites on a surface of the base material. These nucleation sites may be defect sites present in the base material or, in embodiments, sites which are synthesized by chemical modification or functionalization of the surface of the base material. This heterogeneous nucleation enables nanoparticles to be directly anchored onto the surface of the base material via an associated nucleation site. Without wishing to be bound to any particular theory, it is also believed that this type of growth mechanism involves electron transfer between the base material and the nanoparticles, thereby achieving the intimate association and improved properties described above. In addition, this growth mechanism distinguishes the resulting nanocomposites from physical mixtures of a base material and a plurality of nanoparticles. FIG. 1A depicts a schematic of heterogeneous nucleation events associated with formation of an illustrative nanocomposite of a base material and a plurality of nanoparticles.

In embodiments, the base material is a two-dimensional, layered material (i.e., a plurality of two-dimensional sheets layered and bound together, e.g., via van der Waals forces). In such embodiments, the nanocomposite comprises a multilayer stack of a plurality of layers of the two-dimensional, layered material interleaved between a plurality of layers of nanoparticles, wherein individual layers of nanoparticles in the plurality of layers of nanoparticles are each directly anchored on a surface of a layer of the plurality of layers of the two-dimensional, layered material via nucleation sites, and are each separated by multiple layers of the plurality of layers of the two-dimensional, layered material.

Figure 1B:
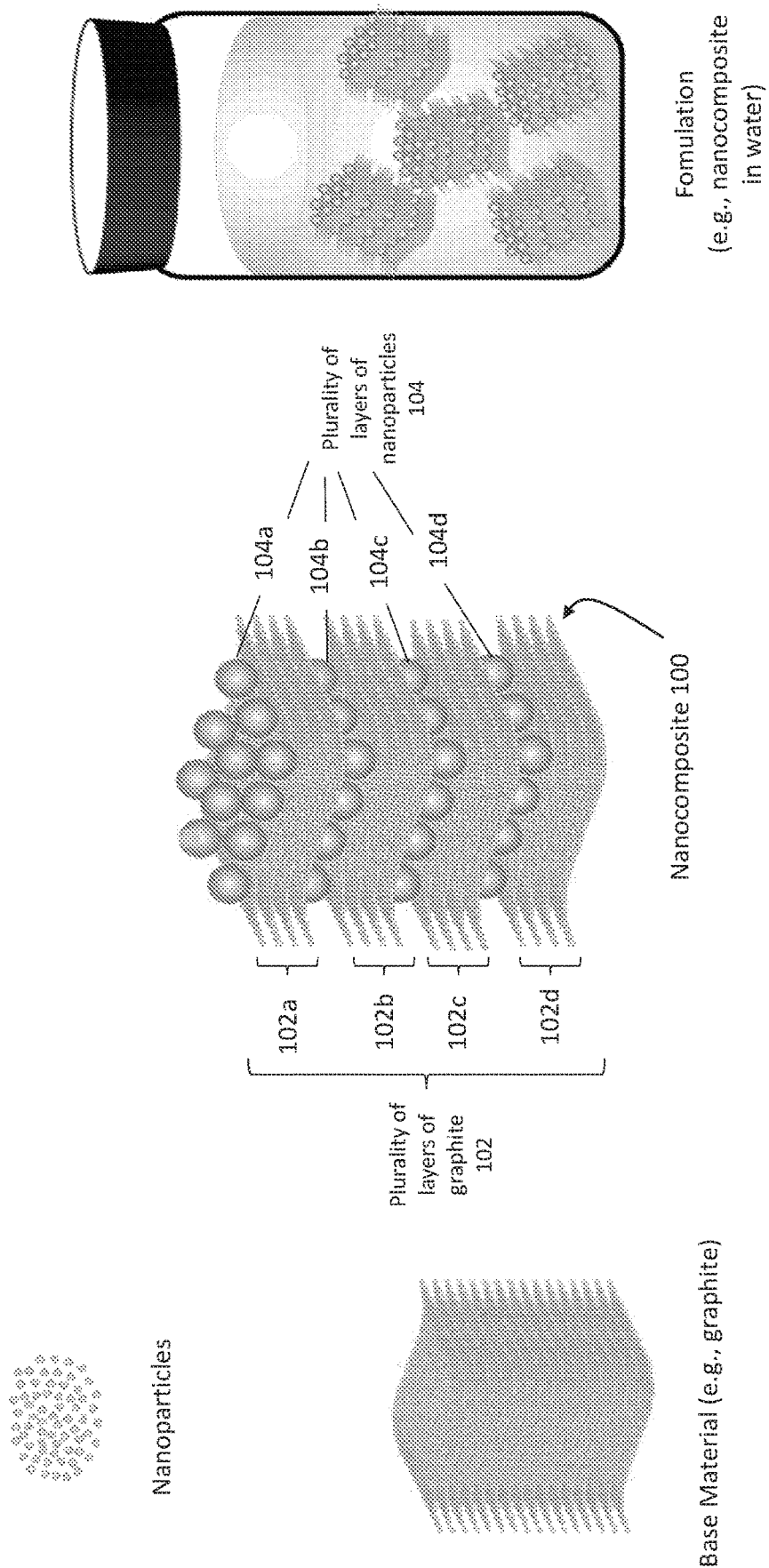
FIG. 1B depicts a schematic of an illustrative nanocomposite of a base material (e.g., graphite) and a plurality of nanoparticles (e.g., $Fe_3O_4$ nanoparticles). The nanocomposite is in the form of a multilayer stack of a plurality layers of graphite interleaved between a plurality of layers of nanoparticles. Individual layers of nanoparticles are each anchored on a surface of a layer (i.e., a layer of graphene) of the plurality of layers of graphite, and are each separated by multiple layers (i.e., multiple layers of graphene) of the plurality of layers of graphite. The nanocomposite is free of isolated graphene; that is, each layer of graphene is in contact with one or more other layers of graphene, as is the case in unmodified graphite. As such, the nanocomposite has a layered morphology similar to that of unmodified graphite. However, as demonstrated in the Example, below, the nanocomposite has greatly improved properties as compared to unmodified graphite.

Such a nanocomposite is illustrated in FIG. 1B, showing a nanocomposite 100 comprising graphite as the two-dimensional, layered base material. In the nanocomposite 100, the plurality of layers 102 of graphite includes multiple layers 102a-d of graphene (an individual layer of graphite is a graphene layer). The plurality of layers 104 of nanoparticles includes individual layers 104a-d of nanoparticles. The multiple layers 102a-d and the individual layers 104a-d are interleaved with one another to form the larger stack which constitutes the nanocomposite. Although the nanocomposite 100 of FIG. 1B shows four layers of nanoparticles, each layer separating a grouping(s) of four layers of graphene, other nanocomposites may have groupings having different numbers of layers of graphene and may have different numbers of layers of the nanoparticles. Individual layers of nanoparticles may be separated by a few (e.g., 2-6) layers of graphene, to several (e.g., 7-11) layers of graphene, or more. A set of a few layers of graphene may be referred to as a layer of graphite; similarly, a set of several layers of graphene may also be referred to as a layer of graphite.

Within the stack, there is direct contact between neighboring layers (i.e., between nanoparticles of a layer of nanoparticles and an adjacent layer of graphene and between adjacent layers of graphene). These layers are held together via van der Waals forces to form the larger stack. As such, the nanocomposite has a layered morphology similar to that of unmodified graphite. Thus, the nanocomposite may be distinguished from composite materials composed of graphene (a single layer) flakes decorated with nanoparticles.

Figure 2:
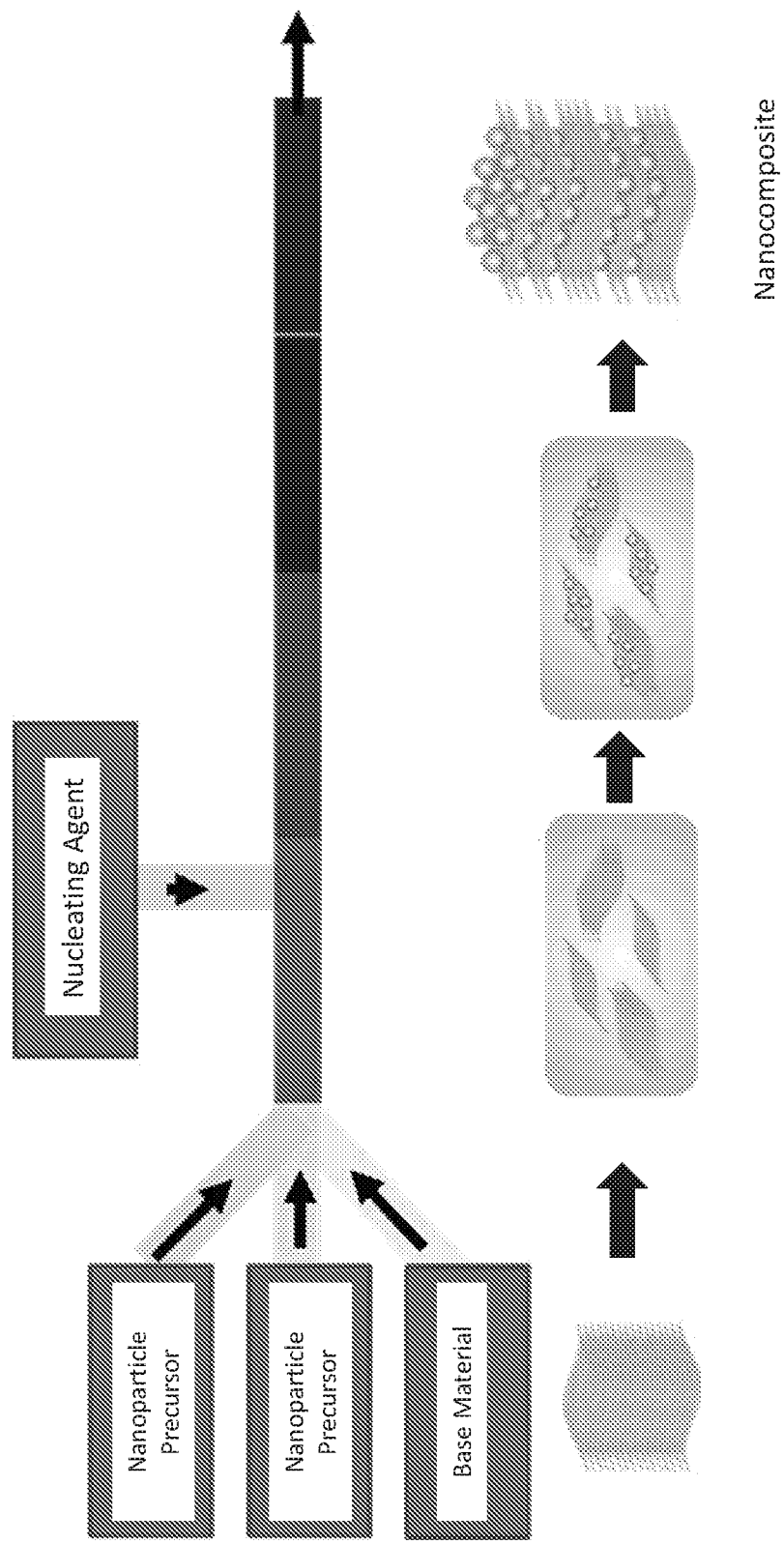
FIG. 2 depicts a schematic of an illustrative method of making a nanocomposite, such as the nanocomposite shown in FIG. 1B.
Figure 3A:
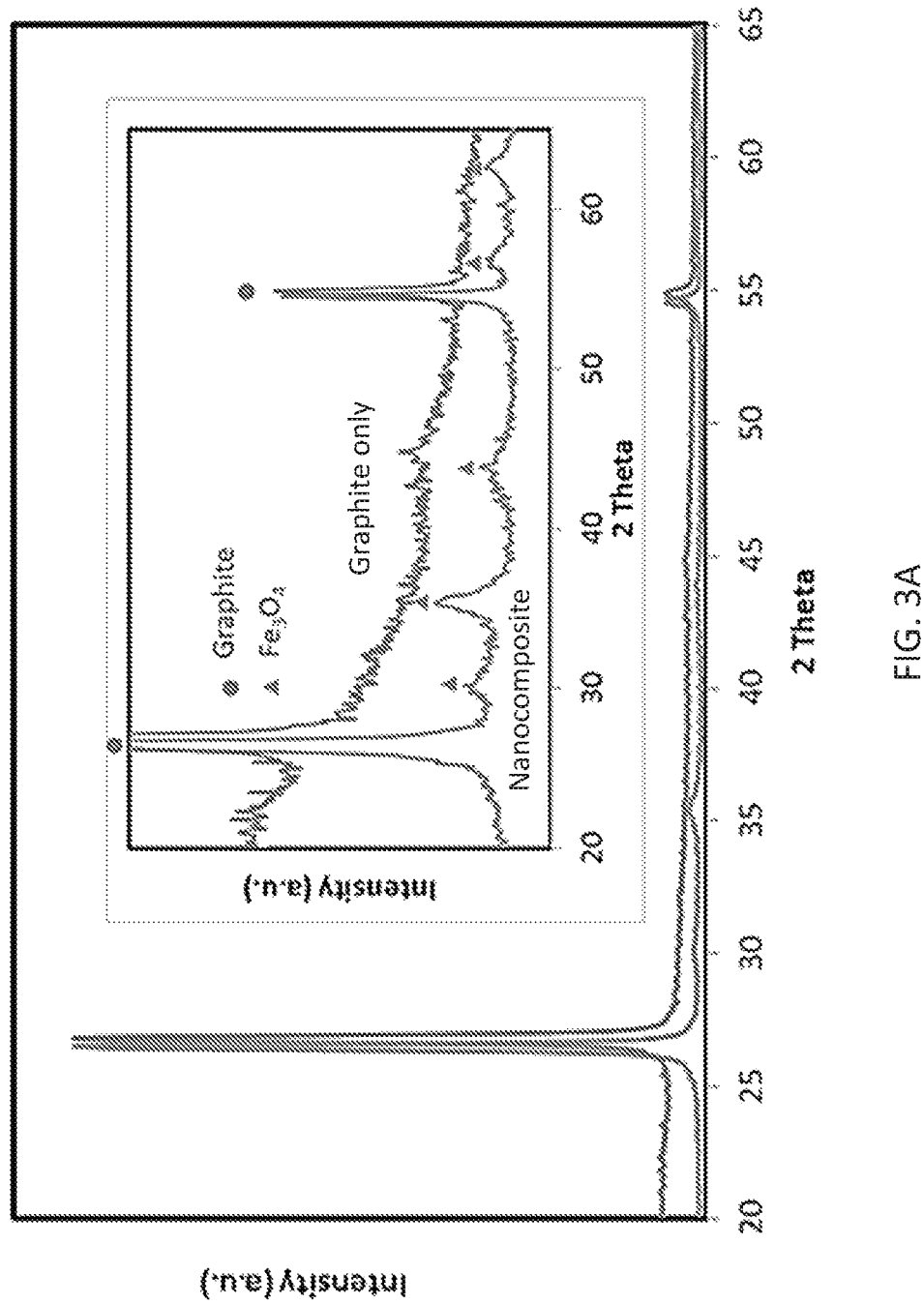
FIG. 3A shows X-ray diffraction (XRD) spectra of pristine graphite (top) and a graphite/$Fe_3O_4$ nanocomposite (bottom) formed using a method similar to that shown in FIG. 2. The inset marks the characteristic peaks associated with graphite (circles) and with $Fe_3O_4$ nanoparticles (triangles). The large (002) peak at $2\Theta=24\text{-}28°$ confirms that the nanocomposite contains graphite and is free of isolated graphene.
Figure 3B:
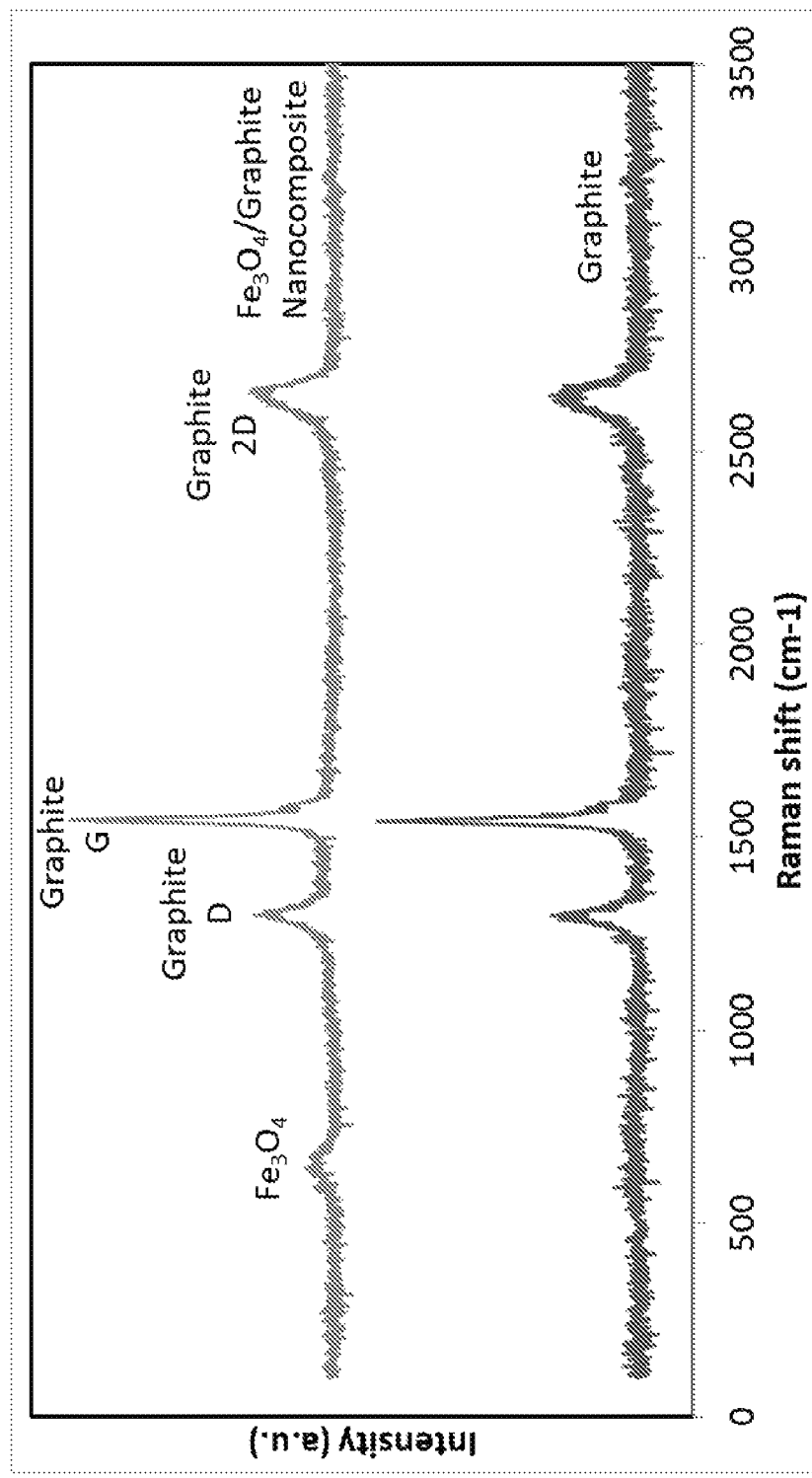
FIG. 3B shows Raman spectra of graphite (bottom) and the nanocomposite of FIG. 3A (top). The nanocomposite has the same characteristic peaks associated with graphite, including the larger G peak as compared to the 2D peak and an additional shoulder present on the 2D peak.

Confirmation that the present graphite nanocomposites have the layered, graphite morphology and are free of isolated graphene may be achieved using X-ray diffraction (XRD) measurements. For example, FIG. 3A shows XRD spectra of pristine graphite (top) and a nanocomposite (bottom) formed using a method similar to that shown in FIG. 2 (see "method 3" described in the Example, below). The nanocomposite is composed of graphite as the base material and a plurality of $Fe_3O_4$ nanoparticles. The inset marks the characteristic peaks associated with graphite (circles) and with $Fe_3O_4$ nanoparticles (triangles). The large (002) peak at $2\Theta=24\text{-}28°$ confirms that the nanocomposite contains graphite and is free of isolated graphene. By contrast, a nanocomposite containing graphene would have at most a minor bump and no distinct peak at this range. Additional confirmation that the present graphite nanocomposites have the layered, graphite morphology and are free of isolated graphene may be achieved using Raman spectroscopy. For example, FIG. 3B shows the Raman spectra of pristine graphite (bottom) and the same nanocomposite of FIG. 3A. The spectrum of the nanocomposite shows the characteristic peaks of graphite, i.e., the G peak at 1540 $cm^{-1}$ that is higher than the 2D peak and the presence of an additional shoulder in the 2D peak of graphite. By contrast, a nanocomposite containing graphene would have its 2D peak significantly higher than the G peak and there would be no shoulder in the 2D peak. By "free" it is meant that the amount of isolated graphene is zero or small enough not to materially affect the properties of the nanocomposite (e.g., the capacity and/or stability of a lithium ion battery comprising the nanocomposite). For other two-dimensional, layered materials, similar confirmation may be carried out to confirm that the nanocomposite is free of isolated layers of the two-dimensional, layered material.

Other two-dimensional, layered materials may be used as the base material besides graphite. Illustrative such base materials include transition metal dichalcogenides, e.g., $MX_2$, wherein M is Mo or W and X is S, Se or Te.

Other carbon-based materials may be used as the base material, e.g., carbon black, carbon nanotubes, carbon onions, carbon dots, fullerenes, nanodiamond, diamond, and carbynes. Other base materials include paraffin wax, manganese oxide, polystyrene, zinc oxide, silica, fluorinated silanes, and polymers such as fluoropolymer. The base material may have a one-dimensional morphology (e.g., carbon nanotubes) or have a zero-dimensional morphology (e.g., nanoparticle or microparticle).

Combinations of different base materials may be used in the nanocomposite.

Regarding the nanoparticles in the nanocomposite, a variety of materials may be used. In embodiments, however, the nanoparticles are metal oxide nanoparticles, which includes but not limited to transition metal oxide nanoparticles. The metal may be a 3d transition metal such as Cr, Mn, Co, Fe, Cu or Ni. The metal oxide may be selected on the basis of its ability to undergo lithiation reactions and delithiation reactions. The metal oxide may be a metal oxide having a spinel structure. An illustrative transition metal oxide is $Fe_3O_4$, but others include $Co_3O_4$, $Fe_2O_3$, $MnO_2$, NiO, CuO, CoO, FeO, MnO, $Mn_3O_4$, ZnO, $SnO_2$, $SiO_2$, $ZrO_2$ etc. The term "metal oxide" encompasses mixed metal oxides, e.g., $MFe_2O_4$ (where M is selected from Co, Ni, Mn, Zn, Ba, Sr, Mg, Cu, and Cr) and $A_xB_{1-x}Fe_2O_4$ (where A and B are independently selected from Fe, Mn, Co, Ni, Zn, Cu, and Cr). In embodiments, the nanoparticles are not $Co_3O_4$ nanoparticles.

Other illustrative materials for the nanoparticles include magnetic materials, metals/metalloids, and semiconductors. Regarding magnetic materials, hard magnetic materials may be used, e.g., CoCrPt, Co, $Co_3Pt$, FePd, FePt, CoPt, CoPd, FeCo, MnAl, $Fe_{14}Nd_2B$, $SmCo_5$. Soft magnetic materials may be used, e.g., $Fe_3O_4$, $MnFe_2O_4$, $NiFe_2O_4$, $MgFe_2O_4$. Other soft magnetic materials include the following soft magnetic ferrite compounds having the formula $M'_xM''_{1-x}Fe_2O_4$, wherein M' and M'' are different and are independently selected from Co, Ni, Zn, Ba, Sr, Mg, Mn and $0 \leq x \leq 1$. In some such embodiments, $0.1 \leq x \leq 0.9$. Other soft magnetic materials include Fe—Si alloy, Ni—Fe alloy, and nanocrystalline alloy of Fe, Ni and/or Co with B, C, P, or Si. Regarding metals/metalloids, illustrative examples include Al, Fe, Co, Au, Ag, Pt, Hg and As. Regarding semiconductors, illustrative examples include Si and Ge. Other metal oxides may be used, including ZnO and $Al_2O_3$. Finally, nanoparticles formed from hetero- and multianion systems, including oxides coupled to halides (e.g., oxychlorides, oxyfluorides), chalcogenides (e.g., sulfides, selenides), halides, oxychalcogenides, and nitrides, may be used.

Within an individual layer of nanoparticles, the nanoparticles may be distributed uniformly (by which it is meant that the nanoparticles are separated by approximately equal distances) across the surfaces of the adjacent material (e.g., layers of a two-dimensional, layered base material) with which they are in contact. In addition, the individual layers of nanoparticles may be free from aggregated nanoparticles. By "free" it is meant that the amount of aggregates is zero or small enough not to materially affect the properties of the nanocomposite (e.g., the capacity and/or stability of a lithium ion battery comprising the nanocomposite).

The size and shape of the nanoparticles is not particularly limited. Thus, the term "nanoparticles" or "nanocomposite" is not meant to be limiting to a particular size. In embodiments, the nanoparticles may have each of their three dimensions on the order of 1000 nm or less. The nanoparticles may be spherical, but this term encompasses irregularly shaped particles which are still reasonably well defined three dimensions which are of similar magnitude. The nanoparticles may be characterized by an average diameter. The average diameter may be 500 nm or less, 200 nm or less, 100 nm or less, 50 nm or less, 25 nm or less, 10 nm or less, 5 nm, or in the range of from 1 nm to 100 nm. In embodiments in which the nanoparticles are magnetic, the nanoparticles may have an average diameter that is sufficiently small so the nanoparticles exhibit superparamagnetic behavior at room temperature (20 to 25° C.). The specific average diameter will depend upon the magnetic material used, but for $Fe_3O_4$ nanoparticles, the superparamagnetic size limit is about 15 nm.

The intimate association of the base material and the nanoparticles described above may be accomplished without any functionalization (i.e., covalently bound functional groups) of either the base material or the nanoparticles. That is, in embodiments, the base material, the nanoparticles, and thus, the nanocomposite are unfunctionalized.

The nanocomposite may include various relative amounts of the base material component and the nanoparticle component, depending upon the desired properties (e.g., the capacity and/or stability of a lithium ion battery comprising the nanocomposite). In embodiments, the nanocomposite has a ratio of (base material):(nanoparticle material) in a range of from 9:1 to 1:9. This includes a ratio of 4:1, 7:3, 3:2, 1:1, 2:3, 3:7, 1:4, etc.

The applications in which the nanocomposite may be used are not particularly limited. Any application in which the selected base material is typically used is desirable, since the base material, modified by the nanoparticles, exhibits enhanced properties as compared to the unmodified base material. Illustrative applications include paints and coatings. Regarding coatings, the nanocomposite may be provided as a film/layer on an underlying substrate, e.g., a porous substrate such as a membrane, filter, or sponge. As shown in FIG. 1B, the nanocomposite may be provided in a formulation with water (or an aqueous solution).

Figure 4:
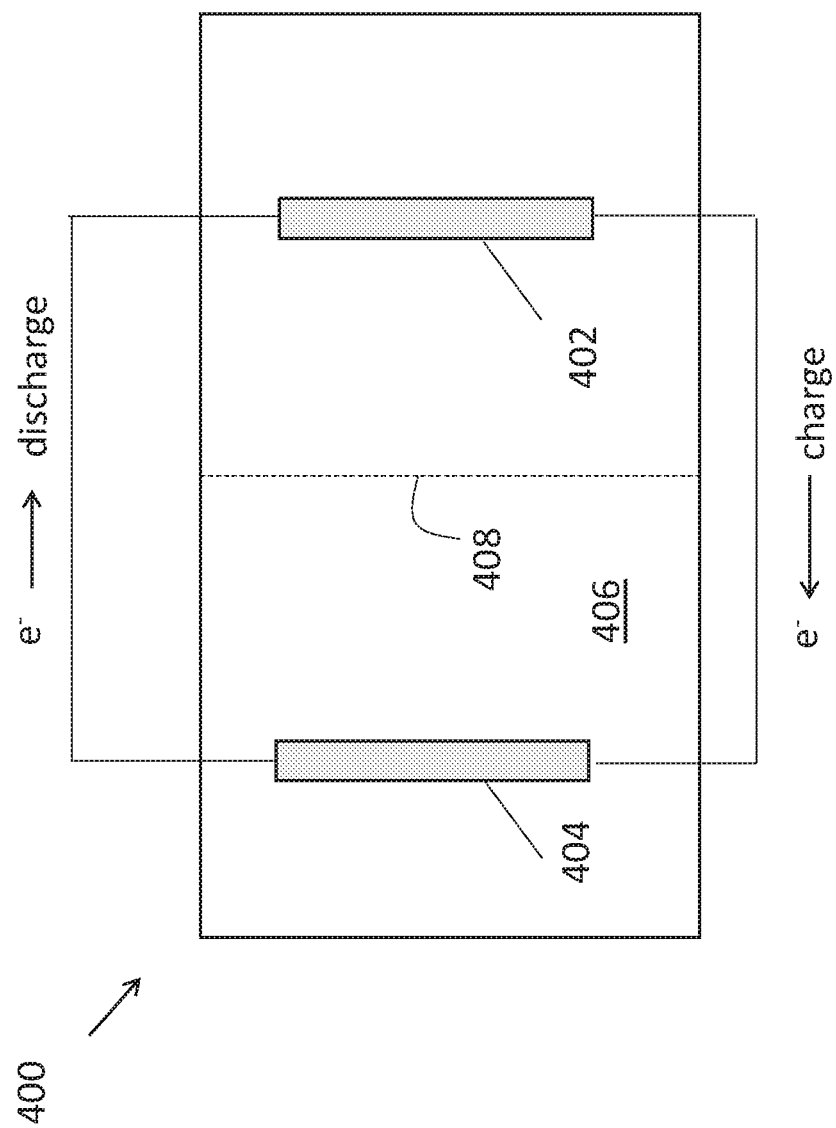
FIG. 4 depicts a schematic of a battery having an anode comprising a disclosed nanocomposite, e.g., the nanocomposite of FIG. 3.

Another application is as an electrode material of a battery, e.g., an anode of a $Li^+$ ion battery. In such an application, the nanocomposite may be used alone or combined with other materials. Such other materials include a binder (e.g., poly vinylidene fluoride (PVDF)). The $Li^+$ ion battery may further include a cathode in electrical communication with the anode; an electrolyte disposed between the anode and the cathode; and a separator also disposed between the anode and the cathode. Known materials may be used for the cathode, the electrolyte and the separator. The nanocomposite may be used as an electrode material in other types of batteries, e.g., sodium ion batteries, magnesium ion batteries, etc. A schematic of an illustrative battery 400 is shown in FIG. 4, including a cathode 402 in electrical communication with an anode 404; an electrolyte 406 disposed between the anode 404 and the cathode 402; and a separator 408 also disposed between the anode 404 and the cathode 402. In the case of a $Li^+$ ion battery, the anode 404 may comprise a nanocomposite as described herein.

The nanocomposite may be characterized by its properties, including an initial capacity when used as an anode of a $Li^+$ ion battery, measured as described in the Example below. In embodiments, the nanocomposite exhibits an initial capacity of at least 800 mAh/g, at least 850 mAh/g, or at least 900 mAh/g. The nanocomposite may be characterized by a saturation capacity after a certain number of charge-discharge cycles (e.g., 100), measured as described in the Example below. In embodiments, the nanocomposite exhibits a saturation capacity after 100 cycles of at least 500 mAh/g, at least 550 mAh/g, or at least 600 mAh/g. In embodiments, the nanocomposite achieves an initial capacity and/or a saturation capacity that is greater than that of a comparative anode material comprising graphite without the nanoparticles (a graphite-only anode), both measured as described in the Example below. In embodiments, the initial capacity is 200%, 250%, or 300% greater and/or the saturation capacity is 50%, 100%, 200%, or 300% greater. Any of these values may be referenced with respect to a current density (e.g., 250 mA/g) used during the measurement of the value.

Methods of making the nanocomposites are also provided. In embodiments, such a method comprises combining a first input stream of flowing fluid (i.e., gas or liquid or both) comprising a base material, a second input stream of flowing fluid comprising a nanoparticle precursor material, and a third input stream of flowing fluid comprising a nanoparticle nucleation agent, to form an output stream of flowing fluid. In embodiments, the fluid is a liquid. The input streams need not be continuous in nature, e.g., discrete or repeated injections of the respective materials/agents may be used.

Next, the output stream is heated or sonicated or both for a period of time. The result of this step is nucleation and growth of a plurality of nanoparticles on a surface of the base material from the nanoparticle precursor material and the nucleation agent. That is, nanoparticle nucleation and growth, induced by the nucleation agent, occurs on the surface of the base material to provide a nanoparticle directly anchored thereon. The nanoparticles essentially become a part of, or embedded within, the base material. This is different than nanoparticles adsorbed onto a surface of a substrate or covalently bound via a functional group. In embodiments in which the base material is a two-dimensional, layered material such as graphite, this step also achieves or maintains exfoliation (separation) of the base material into sub-stacks of multiple layers of the two-dimensional, layered material as well as nucleation and growth of nanoparticles on those sub-stacks. In embodiments in which the base material is a two-dimensional, layered material such as graphite, the base material may be pre-exfoliated, e.g., by being sonicated prior to being combined to form the output stream (i.e., pre-sonicated).

Next, a nanocomposite formed within the fluid of the output stream is collected. This may comprise collecting the output stream and subjecting it to a processing step(s) to recover the nanocomposite. In some embodiments, precipitation of the nanocomposite within the liquid of the output stream may be induced. Precipitation may be induced by stopping the sonication for another period of time. The flow rate of the output stream may also be decreased or stopped. Precipitation may be induced by collecting the output stream, e.g., into a container in the absence of sonication so the precipitate may settle out of the liquid. In embodiments in which the base material is the two-dimensional, layered material, precipitation also achieves self-assembly of the sub-stacks to form the larger stack constitutes the nanocomposite as described above.

The use/type of sonication, the periods of time, and the flow rate may be adjusted to facilitate formation of nanoparticles and nanocomposites having the characteristics described above. Illustrative conditions are described in the Example, below (see "method 3"). The flowing liquid may be water or an aqueous solution. However, organic solvents may also be used. The method may be carried out at room temperature, although in embodiments, higher temperatures may be used. The Example also shows how other methods do not necessarily achieve nanocomposites having all the characteristics described above (see "method 1" and "method 2").

A flow reactor may be used to carry out the method described above. An embodiment of such a flow reactor is shown in FIG. 2. In this embodiment, there are two nanoparticle precursor material input streams and the nucleating agent is a separate input stream added downstream of the other input streams. Various numbers of input streams and various orders of combining them may be used (provided they are combined into the single output stream). Other types of input streams may include input streams comprising other additives (e.g., reducing agents, surfactants), other solvents, etc.

The specific nanoparticle precursor materials and nucleating agents depends upon the choice of the desired nanocomposite. For transition metal oxide nanoparticles, transition metal salts may be used as the nanoparticle precursor materials. In such cases, the nucleation agent may be an oxidizing agent (e.g., a base such as NaOH). As shown in FIG. 2, in embodiments in which the base material is a two-dimensional, layered material such as graphite, exfoliation of the graphite to sub-stacks, nanoparticle nucleation and formation on the sub-stacks, and restacking of decorated sub-stacks to form the larger stack occurs, in situ, within the flowing liquid of the output stream.

In embodiments in which there is the nanocomposite precipitates, the precipitate may be separated, washed and dried prior to use. Thus, in embodiments the nanocomposite is in the form of a powder. However, as described above, the nanocomposite may be provided as a formulation comprising water or an aqueous solution.

EXAMPLE

Experimental Details

Synthesis of $Fe_3O_4$ Nanoparticles: 25 ml (0.2 M) $FeCl_3 \cdot 4H_2O$, 25 ml (0.1 M) $FeCl_2 \cdot 6H_2O$, and 50 ml 1 M NaOH were mixed. The mixture was left to settle down and the precipitate was collected and washed with water and dried in the oven at 60° C. overnight.

Synthesis of Graphite/$Fe_3O_4$ Nanocomposite: Three different methods were used to prepare Graphite/$Fe_3O_4$ nanocomposite:

Method 1—800 mg $Fe_3O_4$ Nanoparticles (5 nm) (from above), 800 mg graphite (flake size ~50 μm), and 800 mL of deionized (DI) water were charged into a 2 L beaker and probe sonicated for 1 hour. The mixture was left to settle down and the precipitate was collected and washed with water and dried in the oven at 60° C. overnight.

Method 2—500 mg graphite and 50 ml 1 M NaOH solution in water were mixed and sonicated. After 10 minutes, stock solution (25 ml 0.2 M $FeCl_3 \cdot 4H_2O$+25 ml 0.1 M $FeCl_2 \cdot 6H_2O$) was added during sonication and sonication was continued for 1 hour. The mixture was left to settle down and the precipitate was collected and washed with water and dried in the oven at 60° C. overnight.

Method 3—A flow reactor with three channels (although four may be used as shown in FIG. 2) was used for this method. In channel 1, partially exfoliated graphite (pre-sonicated 10 mins, 5 mg/ml, 100 ml) in water was used. In channel 2, nanoparticle precursors (25 ml 0.2 M $FeCl_3 \cdot 4H_2O$+25 ml 0.1 M $FeCl_2 \cdot 6H_2O$) was used. In channel 3, 1 M NaOH solution in water was used. All three stock solutions were run through 3 different channels via peristaltic pump and mixed. The output stream was sonicated. Different flow rates were used for the output stream, e.g., from 30 mL/min to 150 mL/min. Next, the mixture was left to settle down to induce precipitation. The precipitate was collected and washed with water and dried in the oven at 60° C. overnight.

Characterization: Particle size and distribution was evaluated using a Hitachi H8100 TEM (200 kV). The crystal structure of the particles was evaluated using a Scintag powder XRD. Energy Dispersive X-ray (EDX) of the nanostructures was evaluated using a Hitachi HD2300.

Results

Three different methods were used to synthesize the graphite/$Fe_3O_4$ nanocomposite. In method 1, dry $Fe_3O_4$ nanoparticles (typical size 5-20 nm) and graphite powder were mixed in water and sonicated. In method 2, graphite was exfoliated in water, and during exfoliation, $Fe_3O_4$ nanoparticles were grown by adding Fe precursors. In method 3, partially exfoliated graphite was passed through an output channel and $Fe_3O_4$ nanoparticles were grown in the same output channel. This way, the exfoliated graphite+$Fe_3O_4$ NPs mixture was produced at the microliter scale and in a continuous manner. This achieves in situ nucleation and growth of $Fe_3O_4$ nanoparticles on exfoliated graphite (exfoliated pieces contained up to a few layers of graphene). FIGS. 1 and 2 illustrate the general synthetic scheme of making the graphite/$Fe_3O_4$ nanocomposite in which $Fe_3O_4$ nanoparticles are grown simultaneously with exfoliation and left to reassemble/restack, resulting in a superior graphite/$Fe_3O_4$ nanocomposite, as further described below.

Transmission electron microscope (TEM) images were obtained for nanocomposites formed using each of the methods (data not shown). The TEM images of the graphite/$Fe_3O_4$ nanocomposites formed using methods 1 and 2 show that $Fe_3O_4$ nanoparticles were integrated on the surface and within layers of graphite flakes. However, most of the $Fe_3O_4$ nanoparticles clustered into larger aggregates. By contrast, the TEM images of the graphite/$Fe_3O_4$ nanocomposites formed using method 3 showed that the nanoparticles were uniformly dispersed across and throughout the graphite. These nanocomposites were free of nanoparticle aggregates. TEM images of graphite/$Fe_3O_4$ nanocomposites formed using method 3 and which had been used as an anode material in 100 charge-discharge cycles were also obtained. The images showed that the morphology of nanocomposite was intact (uniform nanoparticle distribution/absence of aggregation) even after 100 cycles of use.

In addition, FIG. 3A shows the XRD of pristine graphite and the graphite/$Fe_3O_4$ nanocomposite formed using method 3. The inset shows peak details of graphite and $Fe_3O_4$ peaks. The graphite/$Fe_3O_4$ nanocomposite shows characteristic XRD peaks of $Fe_3O_4$ (triangles) as well as graphite (circles), while pristine graphite shows only characteristic XRD peaks of graphite (not graphene). The large (002) peak at $2\Theta=24$-$28°$ confirms that the nanocomposite contains graphite and is free of isolated graphene. FIG. 3B shows the Raman spectra of pristine graphite (bottom) and the same nanocomposite of FIG. 3A. The spectrum of the nanocomposite shows the characteristic peaks of graphite, i.e., the G peak at 1540 $cm^{-1}$ that is higher than the 2D peak and the presence of an additional shoulder in the 2D peak of graphite. This again confirms that the nanocomposite contains graphite and is free of isolated graphene.

Charging-discharging cycles of the graphite/$Fe_3O_4$ nanocomposites used as the anode of an Li-ion battery were obtained (data not shown). The discharging curves followed 3 steps. Step a was lithium intercalation at 1.5 V. Step b was intermediate phase $Li_2Fe_2P_4$ formation at 1.1 V. Step c was $Fe_3O_4$ to metallic Fe conversion at 0.8 V, which was represented by a broad plateau. While charging, the metallic Fe was converted to $Fe_3O_4$ between 1.4 and 2 V. Charging-discharging cycles of graphite only (i.e., unmodified graphite) as the anode of an Li-ion battery were also obtained (data not shown). These comparative data demonstrated typical behavior found in commercially available graphite anodes.

The effect of $Fe_3O_4$ content in the graphite/$Fe_3O_4$ nanocomposites was studied by measuring voltage profiles of three graphite/$Fe_3O_4$ nanocomposites (synthesized via method 1) using different $Fe_3O_4$ and graphite weight % ratios. Charging-discharging cycles of the graphite/$Fe_3O_4$ nanocomposite anode were measured at a current of 50 mA/g (data not shown). The data show an increase in the characteristic $Fe_3O_4$ to metallic Fe conversion plateau as well as an increase in capacity with increasing $Fe_3O_4$ content in the composite. Specifically, for G66Fe33 (Graphite 66.6%, $Fe_3O_4$ 33.3%) there was a plateau width of 175 mAh/g and a capacity of 730 mAh/g. For G50Fe50 (Graphite 50%, $Fe_3O_4$ 50%), the plateau width increased to 250 mAh/g and the capacity to 920 mAh/g due to increased Fe content. For G33Fe66 (Graphite 33.3%, $Fe_3O_4$ 66.6%), the highest plateau width was achieved (around 380 mAh/g) and a capacity of 1180 mAh/g due to highest Fe content. These results show that $Fe_3O_4$ possesses significantly higher capacity than that of graphite.

After the first charge/discharge cycle, the cyclic performance of the same graphite/$Fe_3O_4$ nanocomposites synthesized by method 1 were studied (not shown). Voltage profiles and capacity values of the graphite/$Fe_3O_4$ nanocomposites as anodes after 100 charging-discharging cycles at a current of 250 mA/g were obtained. G66Fe33 showed an initial capacity of ~600 mAh/g, which reduced to 160 mAh/g after 100 cycles. G50Fe50 showed an initial capacity of ~600 mAh/g but saturation at 200 mAh/g after 100 cycles. G33Fe66 showed an initial capacity of ~900 mAh/g, but reduced to 80 mAh/g after 100 cycles. The drop of capacity in all three composites may be due to poor dispersion of the $Fe_3O_4$ nanoparticles in the graphite layers as described above. Out of three samples, only G50Fe50 showed good cyclic performance after the initial drop. Hence, this composition was selected for further experiments, and the cyclic performance of graphite/$Fe_3O_4$ nanocomposites with G50Fe50 composition formed using methods 1, 2, and 3 were compared.

Voltage profiles and capacity values for the G50Fe50 nanocomposite as the anode after 100 charging-discharging cycles at current 250 mA/g were obtained (data not shown). By contrast to G50Fe50 prepared by method 1, G50Fe50 prepared by method 2 showed a high initial capacity of ~680 mAh/g with saturation at 320 mAh/g after 100 cycles. However, G50Fe50 prepared by method 3 showed initial capacity of ~880 mAh/g and saturation at 560 mAh/g after 100 cycles. The method 1 G50Fe50 nanocomposite (based on physical mixing of $Fe_3O_4$ nanoparticles and graphite) resulted in the lowest capacity. The method 2 G50Fe50 nanocomposite ($Fe_3O_4$ nanoparticles grown during exfoliation of graphite nanosheets at the liter scale) showed some improvement. However, the method 3 G50Fe50 nanocomposite ($Fe_3O_4$ nanoparticles grown during exfoliation of graphite nanosheets at the microliter scale in the flow reactor) showed highest capacity after 100 cycles. As discussed above, nanocomposites formed using method 3 had a uniform dispersion of $Fe_3O_4$ nanoparticles in the graphite layers, free of nanoparticle aggregates and free of isolated graphene.

To confirm whether higher $Fe_3O_4$ content could result in higher capacity after 100 cycles, G28Fe72 (Graphite 28%, $Fe_3O_4$ 72%) nanocomposites were synthesized by method 3, and the cyclic performance and capacity of the nanocomposites were compared with the optimized G50Fe50 nanocomposites synthesized by method 3 (data not shown). Although the G28Fe72 nanocomposites showed higher initial capacity of ~1150 mAh/g, the capacity reduced to less than 100 mAh/g after 80 cycles. In comparison, G50Fe50 nanocomposites showed initial capacity of ~880 mAh/g, and the capacity reduced to 560 mAh/g after 100 cycles. The poor cyclic performance of G28Fe72 nanocomposites confirms that the presence of graphite is equally critical to maintaining the cyclic performance. The graphite/$Fe_3O_4$ nanocomposite with co-equal amounts of graphite and $Fe_3O_4$ showed the best cyclic performance and highest capacity after 100 cycles. A similar trend was observed above in which G50Fe50 nanocomposites showed better cyclic performance than G33Fe66 and G66Fe33 nanocomposites.

As a control experiment, voltage profiles and capacity values of graphite-only samples processed by method 1, method 2, and method 3 were measured (data not shown). All the reaction parameters were kept the same, but no $Fe_3O_4$ nanoparticles were added or grown in the solution. A total 6 charging-discharging cycles were measured at current 50 mA/g. (Data was also collected for 100 cycles, not shown.) All the samples showed typical graphite anode characteristics and saturated at capacity of 370-380 mAh/g.

This Example shows that graphite/$Fe_3O_4$ nanocomposites made with a unique design in which $Fe_3O_4$ nanoparticles are uniformly dispersed within graphite layers provides ~50% higher capacity than graphite alone, the current anode material in commercially available Lithium-ion batteries.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A method of forming a nanocomposite of a base material and a plurality of nanoparticles, the method comprising:
    (a) combining a first input stream of flowing fluid comprising a base material having nucleation sites, a second input stream of flowing fluid comprising a nanoparticle precursor material, and a third input stream of flowing fluid comprising a nanoparticle nucleation agent, to form an output stream of flowing fluid;
    (b) heating or sonicating or both heating and sonicating the output stream for a period of time; and
    (c) collecting a nanocomposite formed within the fluid of the output stream, the nanocomposite comprising the base material and a plurality of nanoparticles directly anchored onto a surface of the base material via the nucleation sites, wherein the method is carried out at room temperature.

2. The method of claim 1, wherein the base material is a two-dimensional, layered material and wherein the two-dimensional, layered material is graphite and the nanocomposite comprises a multilayer stack of a plurality of layers of graphite interleaved between the plurality of layers of nanoparticles, wherein individual layers of nanoparticles in the plurality of layers of nanoparticles are each directly anchored on a surface of a layer of the plurality of layers of graphite via the nucleation sites, and are each separated by multiple layers of the plurality of layers of graphite.

3. The method of claim 2, wherein the nanocomposite is free of isolated graphene layers.

4. The method of claim 3, wherein the nanocomposite is characterized by a (002) peak of graphite as determined by X-ray diffraction and a G peak of graphite having a greater intensity than a 2D peak of graphite as determined by Raman spectroscopy.

5. The method of claim 1, wherein the nanoparticles and the base material are unfunctionalized.

6. The method of claim 1, wherein the nanoparticles are magnetic nanoparticles or metal oxide nanoparticles.

7. The method of claim 6, wherein the nanoparticles are transition metal oxide nanoparticles.

8. The method of claim 7, wherein the transition metal oxide is an oxide of Cr, Mn, Co, Fe, Cu or Ni, or combinations thereof.

9. The method of claim 7, wherein the nanoparticles are $Fe_3O_4$ nanoparticles.

10. The method of claim 1, wherein the nanocomposite is free of aggregated nanoparticles.

11. The method of claim 1, wherein the nanoparticles are magnetic nanoparticles and have an average diameter such that the magnetic nanoparticles exhibit superparamagnetic behavior.

12. The method of claim 1, wherein the flowing fluid of the first input stream, the second input stream, the third input stream, and the output stream is water or an aqueous solution.

13. The method of claim 12, wherein the base material is a two-dimensional, layered material; step (b) comprises sonicating the output stream for the period of time; and step (c) further comprises inducing precipitation of the nanocomposite; and wherein the nanocomposite comprises a multilayer stack of a plurality of layers of the two-dimensional, layered material interleaved between a plurality of layers of nanoparticles, wherein individual layers of nanoparticles in the plurality of layers of nanoparticles are each directly anchored on a surface of a layer of the plurality of layers of the two-dimensional, layered material via the nucleation sites, and are each separated by multiple layers of the plurality of layers of the two-dimensional, layered material.

14. The method of claim 1, wherein the base material is a two-dimensional, layered material; step (b) comprises sonicating the output stream for the period of time; and step (c) further comprises inducing precipitation of the nanocomposite; and wherein the nanocomposite comprises a multilayer stack of a plurality of layers of the two-dimensional, layered material interleaved between a plurality of layers of nanoparticles, wherein individual layers of nanoparticles in the plurality of layers of nanoparticles are each directly anchored on a surface of a layer of the plurality of layers of the two-dimensional, layered material via the nucleation sites, and are each separated by multiple layers of the plurality of layers of the two-dimensional, layered material.

* * * * *